Patented Apr. 11, 1939

2,154,168

UNITED STATES PATENT OFFICE 2,154,168

DENTIFRICE

Henry Klein and Emanuel Kaplan, Baltimore, Md.

No Drawing. Application December 29, 1936,
Serial No. 118,089

5 Claims. (Cl. 167—93)

Our invention relates to a new type of dentifrice which can be characterized as a completely edible and nutritious tooth food and tooth cleanser, having properties favoring its impaction in tooth crevices and whose decomposition by mouth organisms or by like mechanisms favors the production in the mouth of alkaline products.

In spite of every extensive use of toothpastes and widespread tooth cleaning propaganda, dental caries continues to remain a major disease in the population.

Recent researches indicate that dental caries is a chemical dissolution of the calcium phosphate salts which constitute essentially the tooth enamel. When caries attacks the enamel the entire carious area is dissolved because there is so little organic matter in enamel that it can not maintain its form and so a cavity results. The initiation of caries appears chemically to be a dissolution of the lime salts. A similar effect can be produced by dilute acids and therefore caries is generally thought to be due to the organic acids produced by decomposing food debris.

Recent important advances in our knowledge of the effects of acids on enamel show that lactic acid solutions from pH 4.0 to 8.0 are able to etch the enamel. This etching effect may be eliminated by adding calcium and phosphate ions to the solution. When the solution becomes saturated with calcium and phosphate ions the enamel no longer is dissolved even in buffers having an acidity as low as pH 5.0. The supersaturated condition of the salvia with respect to calcium and phosphate ions protects the enamel from decalcification by organic acids such as lactic acid. It is only in secluded areas about the teeth where the calcium and phosphate ions in the saliva may not freely flow to neutralize local high concentrations of organic acid, where tooth decay continues to work havoc.

In recent years it has become well established that inclusions of calcium and phosphate in the diet play an important role in the development of excellent tooth structure and in the aiding of the arrest of the carious process. Accordingly, the problem of prophylaxis of dental caries is dependent not only upon the neutralization of tooth destroying acids but also upon proper dietary fortification, especially with respect to calcium and phosphate. Effective neutralization can not be accomplished by the transient introduction of soluble chemical alkalis applied during the short period of tooth brushing. The same consideration holds for the transient effects of antiseptics designed to destroy the germs which produce the acids. And finally, toothbrushing itself can not effectively remove debris from those hidden crevices about the teeth where tooth decay usually begins.

The objects of our invention are as follows:

1. To provide a combination of edible substances containing a high concentration of calcium and phosphate and capable of serving as a vehicle for other nutrients such as vitamins and minerals, such as are essential for tooth development and well being; and so designed that when introduced into the mouth the same factors which favor impaction of food in teeth will favor the impaction of our edible dentifrice. The base of our dentifrice is an edible colloid which will aid in the impaction and holding in place about the teeth of the slowly soluble calcium and phosphate. In this respect our invention is unique in that it differs from the general class of dentifrices by providing a completely edible food product supplying calcium and phosphate at buffered pH values to prevent accumulations of tooth-destroying acids. This calcium and phosphate is contained in a medium favoring impaction in just those areas where tooth destroying acids are produced; namely, in caries susceptible areas in hidden tooth crevices, hence in these susceptible areas our invention offers the same or greater protection in respect to calcium and phosphate than is available to those surfaces of teeth where saliva flows freely.

2. It is a further object of our invention to provide in our dentifrice as the edible bases aiding in the impaction of calcium and phosphate about caries susceptible areas, substances whose chemical composition are such as to favor the growth about these caries susceptible areas of organisms which will produce alkaline products when acting on the edible bases contained in our dentifrice, and at the same time provide a medium unfavorable for the growth of mouth organisms which produce acidity. Such edible bases consist of the groups represented by animal and vegetable protein and nitrogenous materials, and the like.

3. A further object of our invention is to provide in the same dentifrice which supplies buffer or neutralizing capacity to hidden tooth crevices as above indicated, a food unique in that it is designed specifically to supply when ingested those elements essential for adequate tooth development and well being; such essential elements being especially calcium and phosphorus.

Incidentally, our dentifrice may be used as a carrier for other dietary essentials such as iron, copper, and vitamins A, B, C, and D, and the like. Our invention may find application not only in the more specific prophylaxis of tooth decay, but also in those metabolic conditions wherein increased quantities of the ingredients contained in our dentifrice may be desirable.

4. It is a further object of our invention to supply in a variety of physical forms our combination of edible substances which will supply neutralizing buffers to the hidden crevices about the teeth, and at the same time provide nutrients for development and well being of teeth and bones; for example, our dentifrice may be prepared in the form of a paste, powder, compressed wafer or tablet.

5. It is further an object of our invention to supply a completely edible dentifrice capable of exerting beneficial effects on the teeth either when applied directly to the tooth surfaces or when ingested as a food or dietary fortification; such a dentifrice being supplied in a medium, buffered in the range from pH 5.0 to 10.0, but preferably in the alkaline range from pH 7.0 to 10.0.

The nature of our dentifrice can best be described and conveniently so by the following process which we have found suitable for its preparation in the form of a powder.

Heat about 100 parts of water, preferably in a steam or hot water jacketed kettle to a temperature of 70-90 degrees centigrade, preferably about 80 degrees centigrade; then add twenty parts of powdered casein, preferably with constant motor driven agitation. When the casein and water have been uniformly mixed, and when the mixture acquires a temperature of about 70-90 degrees centigrade, preferably about 80 degrees centigrade, and while the hot mixture is being agitated, add to the casein-water system sufficient of a strong hot trisodium phosphate solution to raise the pH to around 5.0 to 10.0, preferably around pH 8.0 to 9.0. For this purpose a fifty percent by weight trisodium phosphate solution in water and maintained at a temperature preferably of about 80 degrees centigrade is used in quantities varying with the final pH desired. In order to adjust the pH of the mixture to around pH 9.0 we use about 7 to 8 parts of this hot fifty percent by weight solution of trisodium phosphate in water for each 20 parts of casein. After this pH adjustment, we add and mix into the system, preferably by motor driven agitation, about sixty parts of impalpably powdered tricalcium phosphate. Then with continued motor driven agitation, we add 4 parts of gum tragacanth. The product as we prepare it, in accordance with the above process has the consistency of a smooth paste. By means of motor driven agitation, we now incorporate flavoring materials and the like into our dentifrice. The product is now dried in a current of warm air, or by other drying process, and the resulting dried material ground to a fine powder.

In other experiments we have successfully incorporated into our dentifrice other dietary essentials such as salts of copper, and iron, and sources of and concentrates of vitamins A, B, C, and D, and the like.

In preparing our dentifrice in the form of a paste, we succeeded in rendering our product while in the package impervious to the decomposing action of bacteria by a variety of means; for example, we compounded and packaged the various previously heat sterilized ingredients under aseptic conditions. In another experiment, we successfully incorporated into our dentifrice about one per cent of a suitable non-toxic food preservative such as sodium benzoate and the like. We have also prepared our dentifrice in the form of a paste by mixing the powdered dentifrice with suitable vehicles such as glycerine and the like, to render the powder paste-like in consistency.

It is to be understood that the above procedures can be varied in many particulars without departing from the scope and spirit of our invention. For instance, the proportion of the various ingredients in each product prepared may be varied to a considerable degree so far as their character and relative weight ratio is concerned, and also so far as the physical character of the method of compounding is concerned, depending upon the particular physical form of the product desired, that is, paste, powder, compressed tablet or wafer. It is to be understood, of course, that the various ingredients may be wholly or in part substituted by other ingredients having the same chemical or physical or physiological properties. We provide that suitable concentrations of calcium and phosphate are included, and we provide further that the final product is an edible one.

Also, in the preparation of the above described dentifrice, we have used other animal and vegetable colloidal substances as bases for our dentifrice, either in admixture with the casein or entirely substituted for the casein. For example, we have used vegetable protein material, animal protein material, milk protein material, casein, egg albumin, gelatin, yeast, blood protein, cereal meal, soy bean material, powdered vegetable substance, powdered cereal substance. We provide only that the resultant composition of matter contain substantial concentrations of calcium and phosphate, and if their presence is desired, other dietary inclusions essential for tooth development and well being; and we further provide that the edible base selected for the dentifrice have properties favoring its impaction in tooth crevices, and in the usually caries susceptible areas, and further, that the edible base supply a medium which is a potential source of alkalinity as a resultant of the decomposition of the edible base by mouth organisms, or as a resultant of like processes.

Also in the manufacture of our dentifrice, the incorporation of calcium and phosphate in the particular form of tricalcium phosphate is not an essential feature of our process. We have varied the nature of the source of the essential calcium and phosphate radicals and the proportions of the ingredients supplying these essential substances to a considerable degree so far as their character and relative weight ratios are concerned. For example, we have used other calcium phosphate salts, powdered bone meal, other calcium salts and other salts of phosphoric acid. We provide only that the source of the calcium and phosphate in the form in which they are present in the completed dentifrice is a non-toxic edible form, and so long as the calcium and phosphate are each present in substantial amounts.

In the preparation of our dentifrice it is to be understood that other edible and/or non-toxic inedible inorganic or organic substances capable of producing a suitable hydrogen ion reaction may be wholly or in part substituted for the trisodium phosphate in our dentifrice, provided that the substances are used in such amounts as to produce a final buffered product in the pH range 5.0 to 10.0, but preferably pH 7.0 to 10.0.

It is furthermore to be understood that in our dentifrice the use of gum tragacanth is not an essential feature. Its purpose is to assist in maintaining the physical integrity of the mixture and to aid in the impaction of the dentifrice in tooth crevices. The gum tragacanth may be wholly or in part omitted or it may be substituted for by other edible substances having similar properties.

In the manufacture of our dentifrice, we have used other edible and/or non-toxic inedible abrasives or tooth cleansers such as cellulose, calcium carbonate, charcoal, and the like, substituted in part for the tricalcium phosphate in the above formula. We provide, however, that substantial amounts of calcium and phosphate remain included in our dentifrice.

We claim:

1. An edible dentifrice resistant to bacterial decomposition comprising an intimate admixture of substantial concentration of a salt containing calcium and phosphate radicals, and a nitrogenous adhesive carrier resulting from the treatment of a substance from the group consisting of casein, egg albumin, gelatin, yeast, blood protein, and vegetable meals with a non-toxic alkaline reagent, the said composition having a pH of approximately 7.0–10.0.

2. An edible dentifrice resistant to bacterial decomposition comprising an intimate admixture of substantial amounts of impalpable tri-calcium phosphate, and a casein-trisodium phosphate adhesive carrier, the said dentifrice composition having a pH of 8.0–10.0.

3. A method for preparing an edible dentifrice which comprises heating a quantity of water to a temperature of approximately 70–90 degrees C., admixing therewith, in quantity sufficient to function as a carrier, an edible nitrogenous colloidal substance from the group consisting of casein, egg alubumin, gelatin, yeast, blood protein, and vegetable meals, adding to the resulting admixture a non-toxic alkaline solution in an amount to provide a pH of 7.0–10.0, admixing with the resultant composition an impalpable powder of a salt containing calcium and phosphate radicals.

4. The method which comprises heating a quantity of water to a temperature of 70–90 degrees C., thoroughly admixing therewith a quantity of casein sufficient to function as a carrier, adding to the said admixture during agitation sufficient tri-sodium phosphate solution to provide a pH of 8.0–10.0 while retaining the aforesaid temperature range, then adding, while thoroughly agitating the mixture, substantial quantities of tri-calcium phosphate.

5. The method as in claim 4, in which the homogenous mixture is dried and powdered, and adding to the resultant powder sufficient glycerine to render the product of paste-like consistency.

HENRY KLEIN.
EMANUEL KAPLAN.